United States Patent [19]

Kovac

[11] 3,904,818

[45] Sept. 9, 1975

[54] REMOVAL OF DARK CURRENT SPIKES FROM IMAGE SENSOR OUTPUT SIGNALS

[75] Inventor: Michael George Kovac, Sudbury, Mass.

[73] Assignee: RCA Corporation, New York, N.Y.

[22] Filed: Feb. 28, 1974

[21] Appl. No.: 446,893

[52] U.S. Cl. ............... 178/7.1; 250/211 J; 250/578; 178/DIG. 26

[51] Int. Cl.² ....................... H04N 5/30; H04N 5/21

[58] Field of Search ............... 178/7.1, 7.2, DIG. 26; 250/211 J, 211 R, 578; 315/169 R

[56] References Cited

UNITED STATES PATENTS 3,584,146 6/1971 Cath et al. .................. 178/DIG. 26
3,800,079 3/1974 McNeil et al. ...................... 178/7.1
3,830,972 8/1974 Siverling et al. .................... 178/7.1

OTHER PUBLICATIONS

RCA Technical Note No. 937, Sept. 6, 1973.

*Primary Examiner*—Robert L. Richardson
*Attorney, Agent, or Firm*—H. Christoffersen; S. Cohen

[57] ABSTRACT

There is produced for each location of an image sensor, such as an X, Y addressed photodiode array or a self-scanned charge transfer array, a signal indicative of the dark current amplitude at that location. During operation of the sensor, when a location producing excessive dark current is read out, rather than using the signal stored at that location, there is instead substituted a signal level which is the average of that stored in adjacent locations of the sensor.

11 Claims, 19 Drawing Figures

REMOVAL OF DARK CURRENT SPIKES FROM IMAGE SENSOR OUTPUT SIGNALS

During recent years there has been a great deal of work in the field of image sensors such as X, Y addressed photodiode arrays and self-scanned charge transfer arrays (both of the charge-coupled and the bucket-brigade types). One of the obstacles to the production of low cost sensors of these various types is "white video defects". These are locations in the array which, when read out, produce a high amplitude signal even though these locations may not have been photoexcited. The signals are usually known as "dark currents" since they can be produced even if the array is kept in the dark. As the number of locations in an array is increased, the possibility of the white video defects increases correspondingly. In other words, as the arrays are made larger, and relatively large arrays such as those having 500 × 500 locations are commercially desirable, the "yield" of all perfect location arrays goes down and does so quite drastically.

The idea of the present invention is to use less than perfect image sensors and to thereby very substantially reduce the cost of the sensors. This is done by producing signals indicative of the dark currents at the various locations of the array and where the dark currents are excessive, substituting for the signal read from such locations a signal at a level which is related to that stored in adjacent locations.

The invention is illustrated in the drawing of which:

Figure 8:
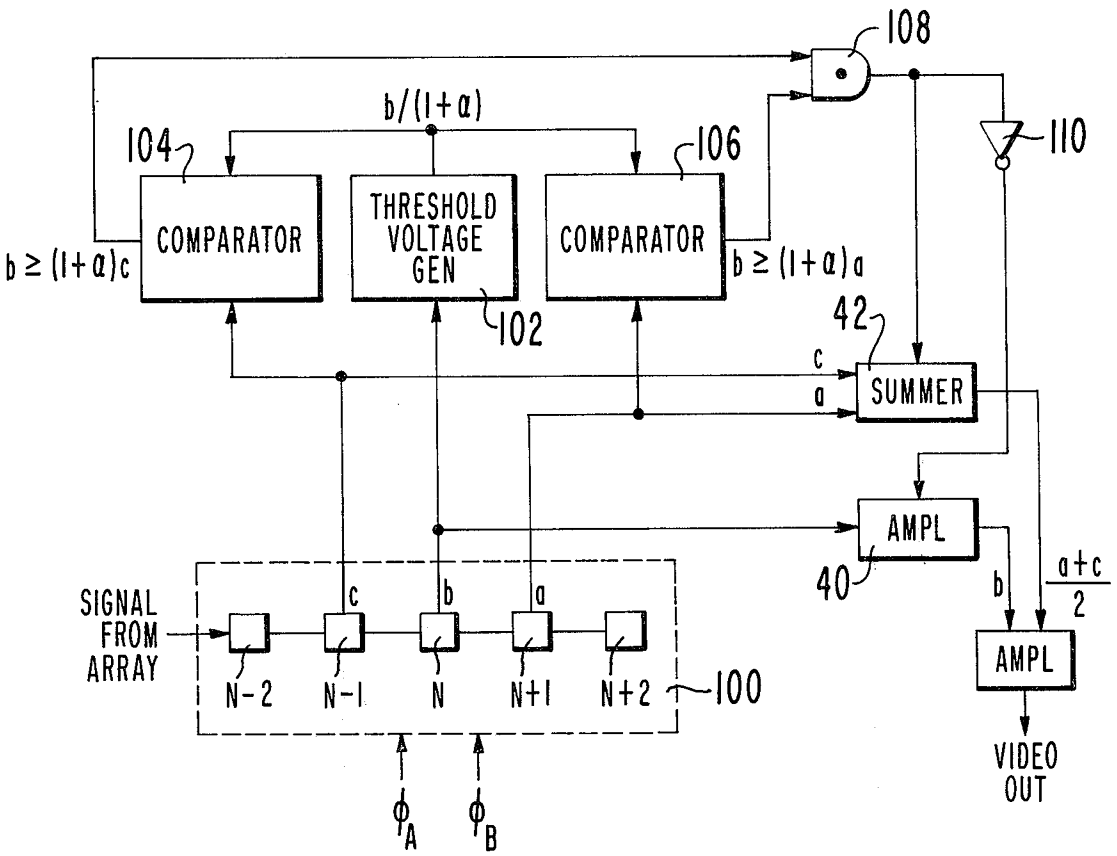
FIG. 8 is a block diagram of another form of the invention.

FIGS. 9*a*–9*k* are a group of waveforms to help explain the operation of the circuit of FIG. 8.

Figure 1:
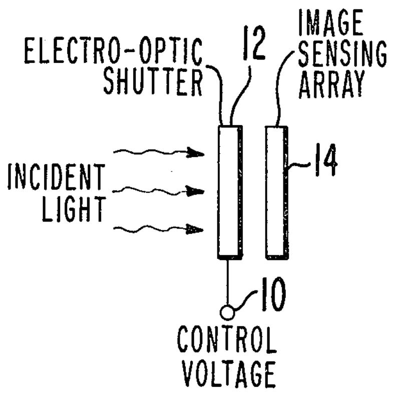
FIG. 1 is a block diagram illustrating one aspect of the invention.
Figure 2:
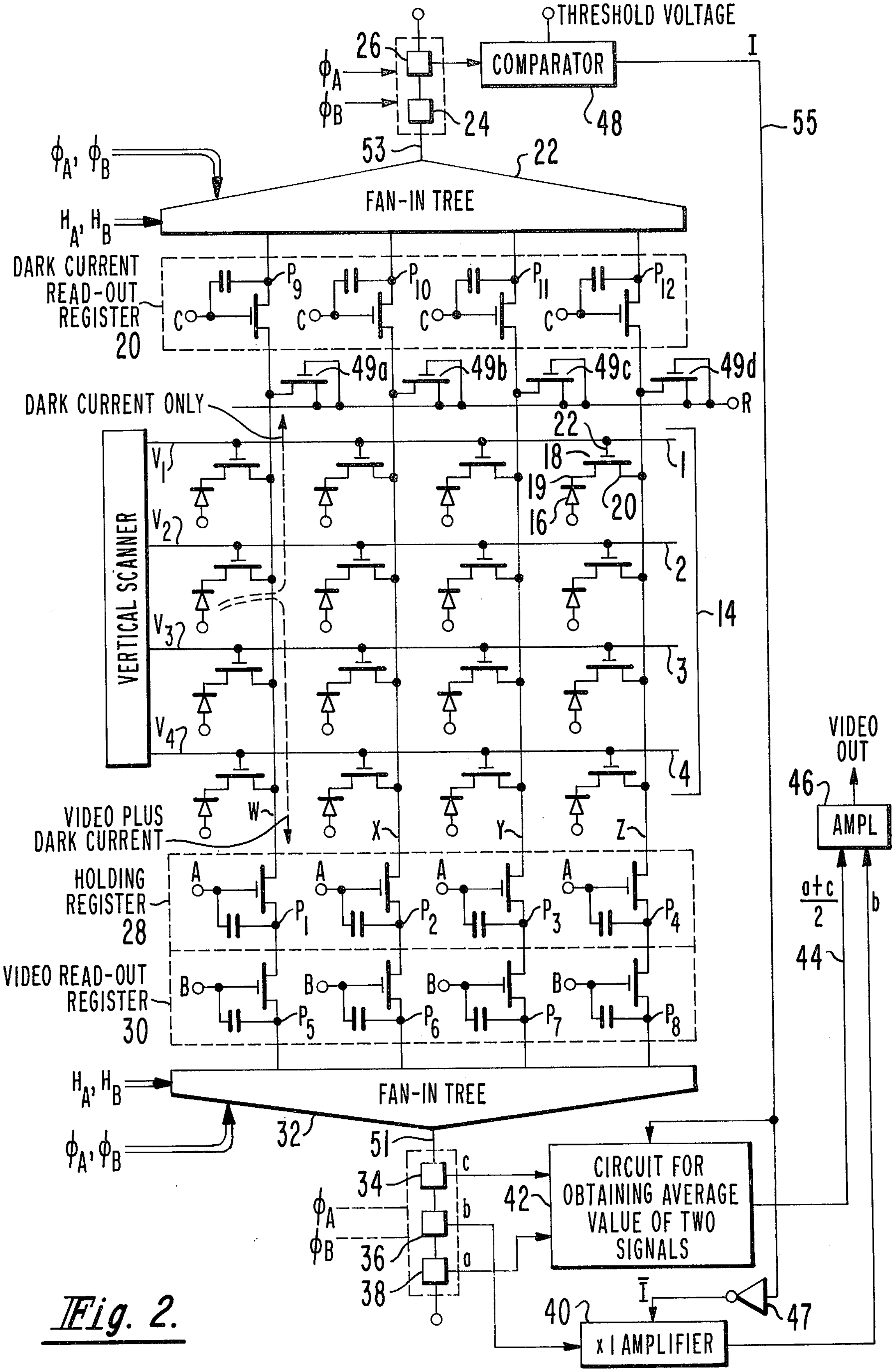
FIG. 2 is a block and schematic circuit diagram of an embodiment of the invention.

In one form of the embodiment of the invention illustrated in FIG. 2, during one period of time a radiation image is projected onto the image sensing array and during a second period of time the array is shuttered. This will be discussed at greater length shortly. FIG. 1 shows a preferred arrangement for accomplishing the shuttering action. It includes an electro-optic shutter 12 location in front of the image sensing array 14. In response to a control voltage applied to terminal 10, the electro-optic shutter may be switched between a substantially transparent and a substantially opaque condition.

Referring now to FIG. 2, the image sensing array 14 is shown by way of example to comprise an X, Y addressed array of photodiodes. For purposes of illustration, the array is shown to include four rows 1–4 and four columns W, X, Y and Z, respectively; however, in practice the array may be much larger than this. Each location of the array includes a photodiode, such as 16, connected between the substrate (not shown but assumed to be at the anode electrode of the photodiode) and the source electrode 19 of an n-type metal oxide semiconductor (MOS) transistor 18. The drain electrode 20 of the transistor is connected to a column conductor and the gate electrode 22 is connected to a row conductor.

The matrix 14 is connected at its column conductors to a dark current readout register 20. This register is connected through a fan-in tree 22 to output stages 24 and 26.

The column conductors are also connected to a holding register 28 and this holding register is connected to a video readout register 30. The latter supplies signals to a fan-in tree 32 and the fan-in tree connects to output stages 34, 36 and 38. The transistors in the various registers are n-type transistors.

Stage 36 connects to a unity gain amplifier 40 lengended "times 1" in the figure. Stages 34 and 38 connect to summer circuit 42 which produces an output signal at lead 44, of an amplitude equal to the average of that present at stages 34 and 38. Amplifier 46 receives the signal produced by one of the amplifiers 40 or 42 as discussed shortly. The one of these amplifiers chosen is controlled by the signal produced by comparator 48, as is also discussed shortly.

The terminal R and the diode-connected MOS devices 49*a*–49*d* are not employed in this embodiment of the invention and may be ignored in the discussion of the operation which follows. (R may be placed at the substrate potential to maintain transistors 49*a*–49*c*, which are of n enhancement type, off.)

In the operation of the system of FIG. 2, assume that the capacitance exhibited by each photodiode or, more precisely, the distributed capacitance between the source electrode 19 of each transistor 18 and the substrate, initially is charged. It also may be assumed that one line time has a duration of 60 microseconds, 50 microseconds active line time and 10 microseconds retrace time (as shown by way of reference by waveform "HORIZ.SYNCH" in FIG. 4). During the period of 0 to 20 microseconds, the electro-optic shutter is open. During this period and the corresponding period of the three previous line times, the image projected onto the image receiving surface of the array is sensed by the photodiodes of the array. These photodiodes conduct to an extent proportional to the amount of radiation they receive and cause the distributed capacitances across the diodes to discharge a corresponding amount. Thus a pattern becomes stored in the array corresponding to the radiation pattern (the "image") projected onto the array.

Figure 4:
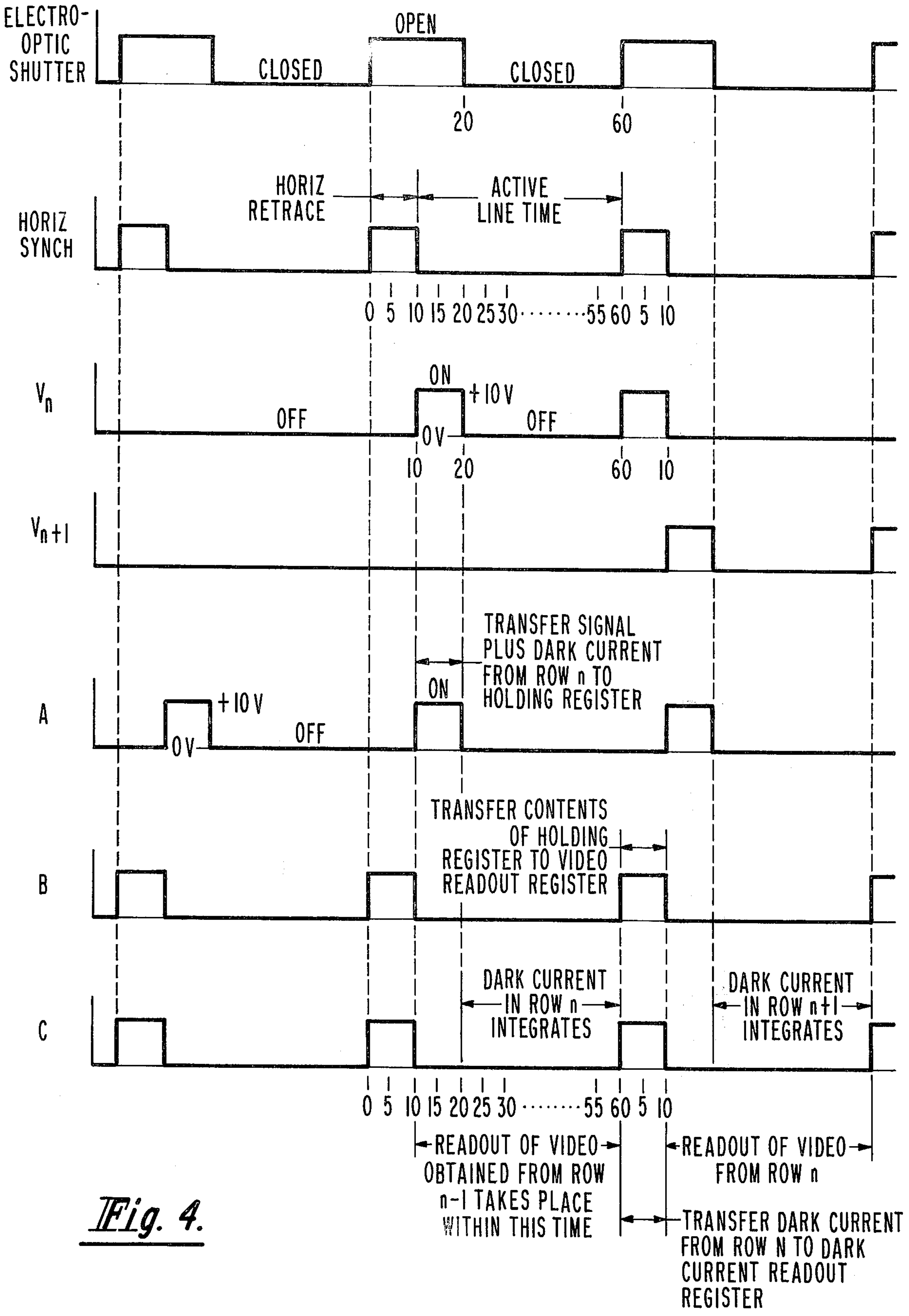
FIG. 4 is a drawing of waveforms to help explain the operation of the system of FIG. 2.

Assume now that it is desired to read out the portion of this pattern stored in row 1. Referring to FIG. 4, $V_X=V_1$ goes high (to +10 volts, for example) during the period 10 to 20 microseconds. The A transfer signal also goes high during this same period. As a result, the charge stored in row 1 causes a flow of charge to the nodes $P_1$, $P_2$, $P_3$, $P_4$ of the holding register 28, and the distributed capacitances across the photodiodes 16 of row 1 become recharged to a reference level in the process.

At time T=20 microseconds, the electro-optic shutter is closed. From the time T=20 microseconds to T=60 microseconds during which the shutter remains closed, the dark current in row 1 integrates, that is, the thermally excited carriers at each location in row 1, which hopefully are few in number, cause conduction through the respective photodiodes in row 1 to extents proportional to numbers of carriers at said locations, to produce a dark current charge pattern in row 1. Following this $V_1$ goes high again and the control signal C goes high. This causes the transfer of the dark current signals from row 1 to anodes $P_9$, $P_{10}$, $P_{11}$ and $P_{12}$ of the dark current readout register 20. The actual transfer occurs during the initial portion (within a microsecond or less) of the time C goes high so that the fact that the shutter is open and light is again reaching the array during the transfer creates no problems. (However, as an alternative, the transfer pulse C can be made to occur during the latter part of 20 to 60 microsecond interval so that the shutter is still closed during the transfer.) The capacitances of the photodiodes in row 1 again become charged in the charge process. Concurrently, the transfer pulse B occurs to transfer the contents of the holding register 28 to nodes $P_5$–$P_8$ of the video readout register 30.

Summarizing, at this point the row 1 dark current signals are stored at nodes $P_9$ to $P_{12}$ and the row 1 video plus dark current signals are stored at nodes $P_5$–$P_8$.

The signals at nodes $P_5$–$P_8$ are then transferred, in sequence, to the fan-in tree 32, and after traveling through equal length paths in the tree appear as serially occurring signals at output line 51 of the tree. During the same period the dark current signals at nodes $P_9$–$P_{12}$ are propagated through fan-in tree 22 and appear as serially occurring signals at output line 53. The fan-in trees 22 and 32 are in themselves known and are described in RCA Technical Note 937 by the present inventor, titled "Charge Transfer Image Sensor" and dated September 6, 1973. In brief, the horizontal scan voltages $H_A$, $H_B$ cause the signals at the input nodes to each tree sequentially to be gated to the input terminals of the tree, and the multiple phase voltages $\phi_A$, $\phi_B$ cause these signals to be transferred via equal length paths, to the output lead of the tree.

The sequential dark current signals produced by fan-in tree 22 are transferred to stages 24 and 26 by multiple phase voltages in a manner shortly to be discussed. The output signal at stage 26 is applied to comparator 48, which comparator also receives a threshold voltage at a given level (which preferably is adjustable). In the event that the dark current amplitude is lower than the threshold voltage, the comparator 48 produces no output; in the event that the dark current signal is greater than the threshold level, the comparator 48 produces an output voltage I at lead 55.

The signals from fan-in tree 32 are transferred sequentially to stages 34, 36 and 38. At roughly the same time that a signal from a particular location such as X1 (column X, row 1) reaches stage 36, the dark current from that same location reaches stage 26 and is applied to the comparator 48. (Actually it is desirable effectively slightly to delay the signal at 36 relative to that at 26 for reasons to be discussed shortly.) The signal *b* from stage 36 is applied to amplifier 40 which, when active, produces an output signal *b* proportional to its input signal. Amplifier 40 is active when the comparator output is absent, that is, when the location which produced the *b* signal does not have excessive dark current.

The circuit 42 receives signals from stages 34 and 38. It may be a simple summing circuit with gain adjusted to produce, when active, an output signal proportional to $$\frac{a+c}{2}.$$

If the *b* signal corresponds to location X1, then the *a* and *c* signals are from locations W1 and Y1 respectively. Amplifier 42 is active when the comparator output I is present, that is, when the location which produced the *b* signal had excessive dark current. Amplifier 46 receives whichever signal is present, that is, either *b* or $$\frac{a+c}{2}$$

and produces a video output signal corresponding thereto. (Note that while in the present example the circuits 40 and 42 produce outputs *b* and $$\frac{a+c}{2},$$

the gains of stages 40 and 42 can be a value other than 1 so that, in general the outputs of these stages will be *nb* and *n*

$$\left(\frac{a+c}{2}\right).$$

respectively.)

Summarizing the operation just described, if information is read from a location in row 1 of the array which produces excessive dark current, the system substitutes for the signal produced at that location, a signal at a level equal to the average of the signal read from surrounding locations. If the information is read from a location in row 1 of the array which produces an acceptable level of dark current, the signal from that location is used.

The operation just described for row 1 is repeated for each following row until the entire array is read out. As in the case of row 1, any location producing excessive dark current is not used. Instead the signal read from adjuacent locations is averaged and used.

It is important in the design of the circuit of FIG. 2 that the control signals I and $\bar{I}$ reach the circuits 42 and 40 slightly before the information signals *a*, *b* and *c* have reached the input terminals of these circuits 40 and 42. There are a number of ways this may be accomplished. One is to use circuits within blocks 40 and 42 which exhibit the desired delay. Another is to use analog delay lines in series with the leads from stages 34, 36 and 38. A third method is slightly to delay the $\phi_A$ and $\phi_B$ signals employed for the fan-in tree 32 and the output stages 34, 36 and 38 relative to the $\phi_A$ and $\phi_B$ signals employed for the fan-in tree 22 and the output stages 24 and 26. If a relatively large delay is needed the comparator 48 may be connected to stage 24 rather than 26. (All of the above are design expedients, the one chosen depending upon the relative delays of the paths 48, 55 and 40 (or 42).)

There are certain "end effects" which have not yet been discussed. For example, it may be that one of the end elements of the array such as location $W_1$ produces excessive dark current. In this event, when the signal read from that location is in output stage 36, the signal from location X1 will be at stage 34 but stage 38 can be empty. In a large array, say one having 500 elements per line, this problem may be dealt with simply by not using the first and 500th elements for supplying information to a display (not shown) such as a television receiver. These are used instead simply to deal with the end effects. As a second alternative, logic stages more complicated than those dealt with here can be used for sensing the condition that an end element is producing excessive dark current and in response thereto for simply substituting for the *b* information the information present at *c* rather than $$\frac{a+c}{2}$$

or for inserting the c information in both stages 34 and 38 so that amplifier 42, produces an output $$\frac{c+c}{2}=c.$$

The assumption is made in the discussion above that the white video defects occur singly and in somewhat random fashion. It is believed that this is a reasonable assumption compatible with what occurs in the manufacture of electron discharge type image receiving devices such as vidicons and the like. However, again with more complex logic than discussed above, the present arrangement still may be used to compensate for white video defects which occur in clusters of reasonably small size. For example, the logic may be such as to sense for the presence of excessive dark current in two or three adjacent locations and in response thereto to substitute the average signal read from good location reasonably close to those producing excessive dark current.

Figure 3:
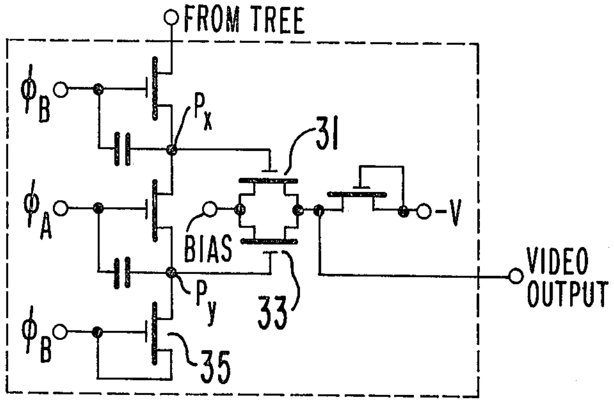
FIG. 3 is a circuit diagram of a portion of the system of FIG. 2.

FIG. 3 illustrates by way of example a stage such as 38 of FIG. 2. (This is only one of a number of possible alternatives; others include CCD register stages and other forms of transistor register stages). This is a circuit for removing serrations from the video signal. The pulse $\phi_B$ causes the video signal present at node $P_X$ to be supplied via source follower 31 to the video output terminal during one-half period of the clock pulse $\phi_B$ (when $\phi_B$ is positive). $\phi_A$ causes the signal present at node $P_Y$ to be transmitted via source follower 33 to the video output terminal during the second half period of the clock pulse when $\phi_A$ is positive. A more detailed discussion of this circuit appears in U.S. Pat. No. 3,746,883 issued July 17, 1973 to the present inventor. Stages 34 and 36 each include, except for transistor 35, the same elements as shown in FIG. 3. Transistor 35 is a terminating element operating as a load resistor and is included only in the final stages such as 38 and 26 of FIG. 2.

Figure 5:
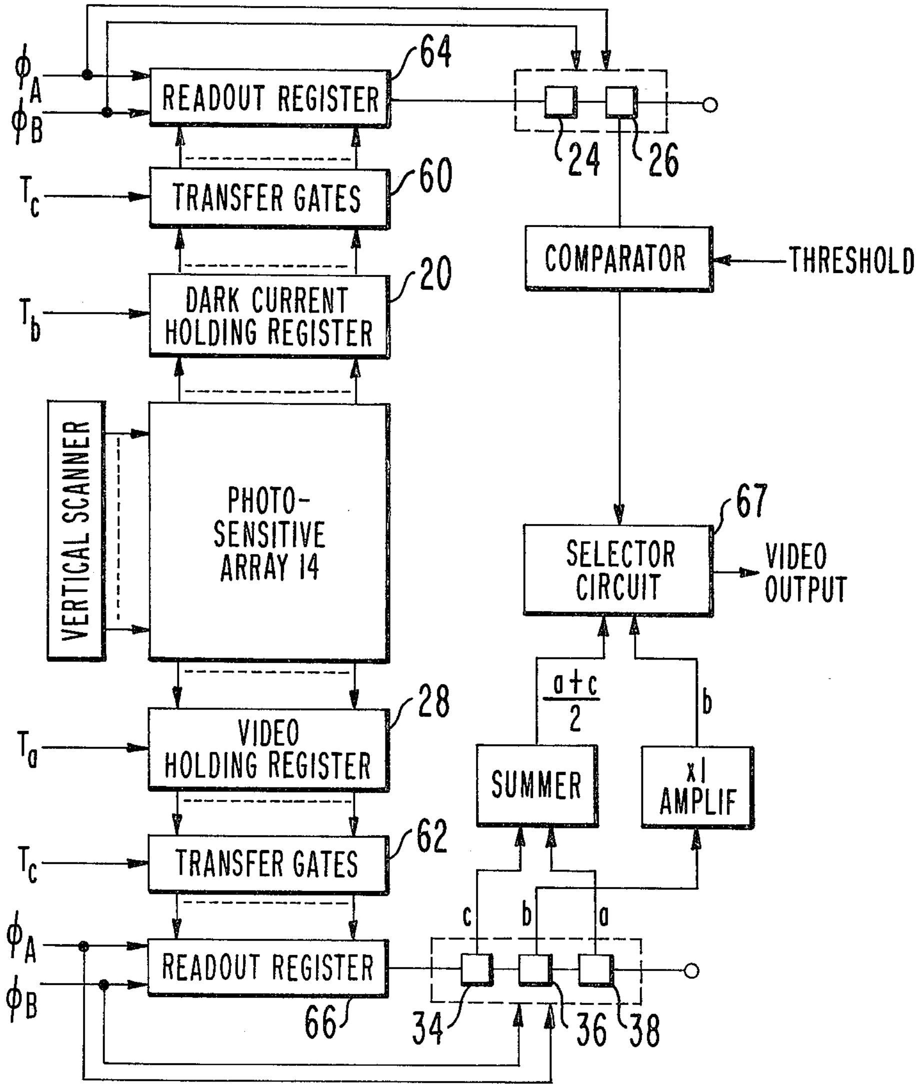
FIG. 5 is a block diagram of another embodiment of the invention.

In the form of the invention shown in FIG. 5, the photosensitive array 14 may be of the same type as shown in FIG. 2. The same holds for the dark current holding register 20 and the video holding register 28. However, rather than employing fan-in trees, transfer gates and readout registers are used.

During one portion of a line time (10–20 $\mu$ sec in FIG. 4) the signals indicative of signal and dark current are transferred from the photosensitive array to the video holding register 28. The signal $T_a$ is employed to effect the transfer. During a following period (20–60 $\mu$ sec) of the same line time, the photosensitive array is shuttered in the manner already discussed. At the end of this period, that is, after a suitable dark current integration time, the signal $T_b$ causes the dark currents from the row of interest to transfer to the dark current holding register 20. $T_b$ may occur, for example in the period 60–10 $\mu$ sec. Thereafter, the control voltage $T_c$ applied to the transfer gates 60 and 62 causes the signals stored in registers 20 and 28, respectively, to transfer to the readout registers 64 and 66, respectively. Thereafter, the multiple phase voltages $\phi_A$ and $\phi_B$ applied to the readout registers cause their contents to transfer to the output stages 24 and 26, in one case, and 34, 36 and 38 in the second case. The remainder of the circuit operates in the same general way as in the FIG. 2 circuit. The selection of *b* or $$\frac{a+c}{2}$$

is shown to occur within selector circuit 67 and may be accomplished by simple circuits. One example, is to employ dual transmission gates formed of complementary MOS transistors; one such dual gate is in series with the output lead of circuit 40 and another dual gate in series with the output lead of circuit 42 these gates being controlled by the signals $\bar{I}$ and I.

In the circuit of FIG. 5 as in FIG. 2, the control signals, corresponding to I and $\bar{I}$ of FIG. 2 should be present slightly before the signals *b* and $$\frac{a+c}{2}$$

are applied to the selector circuit. The means for accomplishing this already have been discussed.

Figure 6:
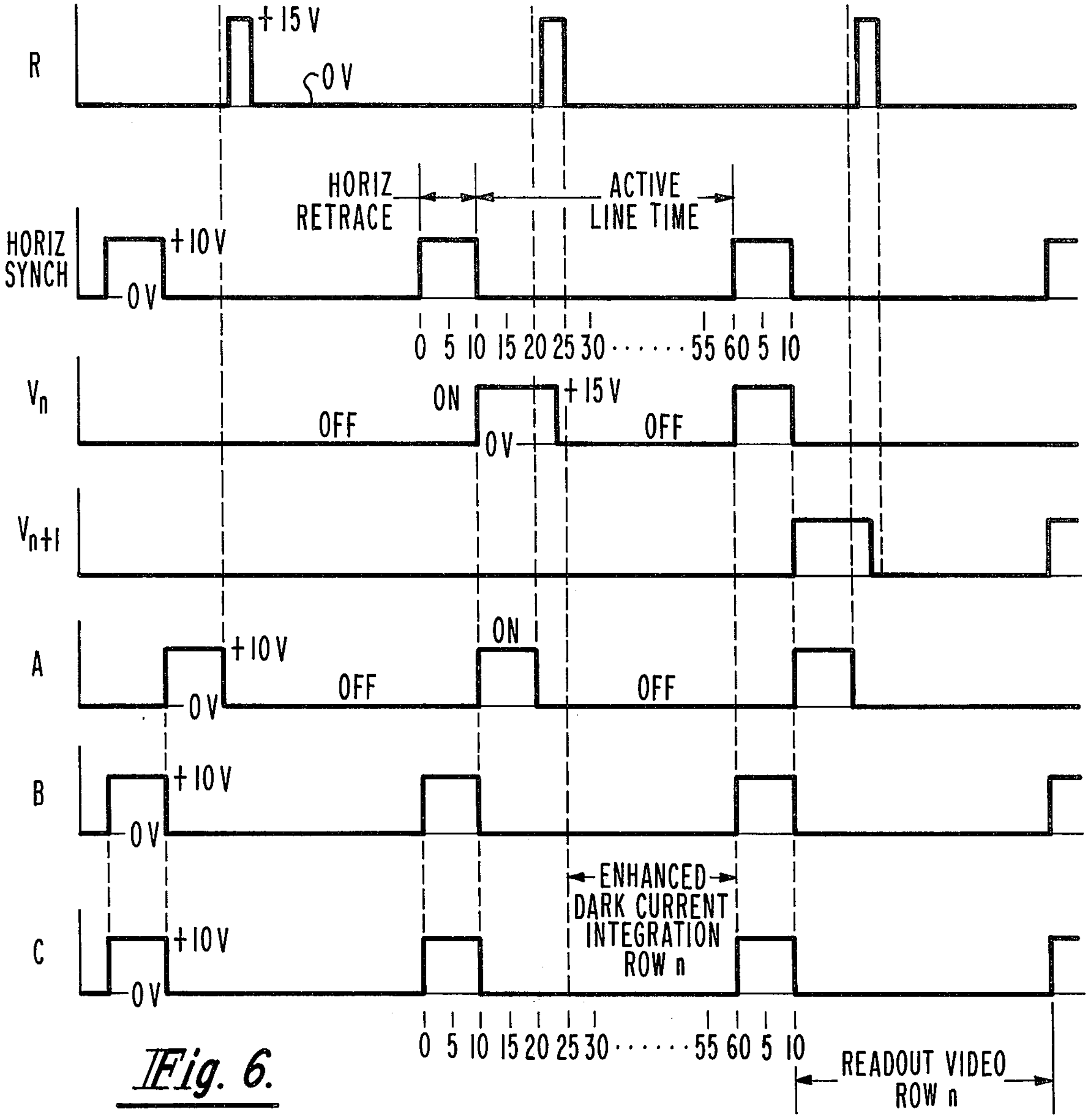
FIG. 6 is a drawing of waveforms to help explain the operation of another embodiment of the invention.

The waveforms of FIG. 6 illustrate a way of operating the system of FIG. 2 (or of FIG. 5) without the use of a shutter. Here, what is done, is to apply to the reset terminal R, immediately after the transfer of video plus dark current information to holding register 28 (FIG. 2), a relatively high amplitude pulse. For example, a short duration 15 volt pulse may be employed. This short duration pulse occurs during the first pulse $V_X$ (10–25 $\mu$sec) (after the photogenerated plus dark current signals have been read out) of the two $V_X$ pulses employed for selecting each row. The effect of this R pulse is to charge the capacitor (the photodiode capacitance) connected to the source electrode to a relatively high voltage level (approximately 15 volts) so that upon removal of the pulse R, the charged capacitor maintains the photodiodes in the row selected back biased to this relatively higher voltage (in the previous circuits the diodes are operated at 10 volts rather than 15 volts).

Figure 7:
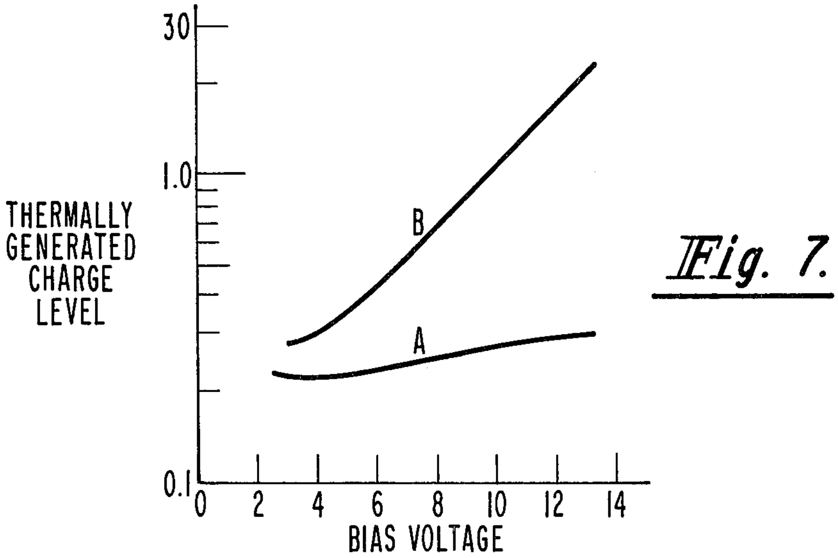
FIG. 7 is a graph showing the relationship between dark current and bias voltage.

As illustrated in FIG. 7, the relatively high back bias accentuates the effect of the dark current (legended "thermally generated charge level") and does this preferentially relative to the desired signal. At the relatively high bias level, the curve B represents the dark current accentuation and the curve A represents the photo induced signal accentuation. Note that the B level increases very markedly while the A level is hardly affected.

In other respects, the operation of the system is the same as in the shuttered embodiments. During one interval of time, the signal plus dark current information is read out of the array 14 and into the holding register. Upon the termination of this readout, the dark current accentuating pulse R is applied. Thereafter, the dark current is permitted to integrate (time period 25 to 60 microseconds in FIG. 6). Thereafter (time period 60 to 10 microseconds) the integrated dark current is transferred to the dark current readout register 20.

A final form of the invention is illustrated in FIG. 8. The signal from an array of any kind, either one of the solid state type such as has been discussed or any other kind of image sensing camera such as a vidicon, for example, is applied, in serial fashion, to the register 100. The stages N-2, N-1 and so on of the register can be similar to the stage shown in FIG. 3, with stage N+2 having all the elements of FIG. 3 and the previous stages having all of the elements except the transistor 35.

In operation, when a signal reaches stage $b$, it is applied to the threshold voltage generator (an amplifier with a gain of less than 1). This threshold voltage generator produces an output signal $b/(1+a)$, where $a$ is some fraction such as 0.10. This signal is applied to comparators 104 and 106. The comparators compare this signal with the signals C and A, respectively, present in the preceeding and succeeding stages. If the signals $b \geq (1+a)c$, then the comparator 104 applies an output representing the binary digit (bit) 1 to AND gate 108. Similarly if $b \geq (1+a)a$, comparator 106 applies a 1 to AND gate 108. If both signals are present, the AND gate produces an output which it applies as an enabling signal to summer 42 and if either signal is absent, the inverter 110 applies an enabling signal to amplifier 40.

In brief what the circuit of FIG. 8 does is to sense the signal level at point $b$. Assume that $\alpha$ is a number such as 0.1. If $b$ is greater than 1.1 times $c$ and is greater than 1.1 times $a$, then it is assumed that the signal present at $b$ includes a dark current spike. In this event, the $b$ signal is not passed to the video output terminal. Instead the circuit averages the signals $c+a$ and applies this average signal to the video output terminal.

An advantage of the circuit of FIG. 8 is that it is suitable for all kinds of image sensing arrays. A second advantage is that no shuttering is needed nor is it necessary directly to sense the dark current amplitude. Another feature of this circuit is that it will discriminate against any kind of noise, whether due to dark current or to some other cause. However, care must be taken to choose a proper volue of $\alpha$. If not, then, for example, a checkerboard pattern will be completely eliminated. In other words, one must choose a rejection level that still permits a reasonable change in amplitude of signal derived from adjacent locations without discriminating against these signals but which still eliminates noise spikes. If 0.1 (10%) is too close a figure, it may be necessary to go up to 15 or 20%.

Figures 9A, 9B, 9C, 9D, 9E, 9F, 9G, 9H, 9I, 9J, 9K:
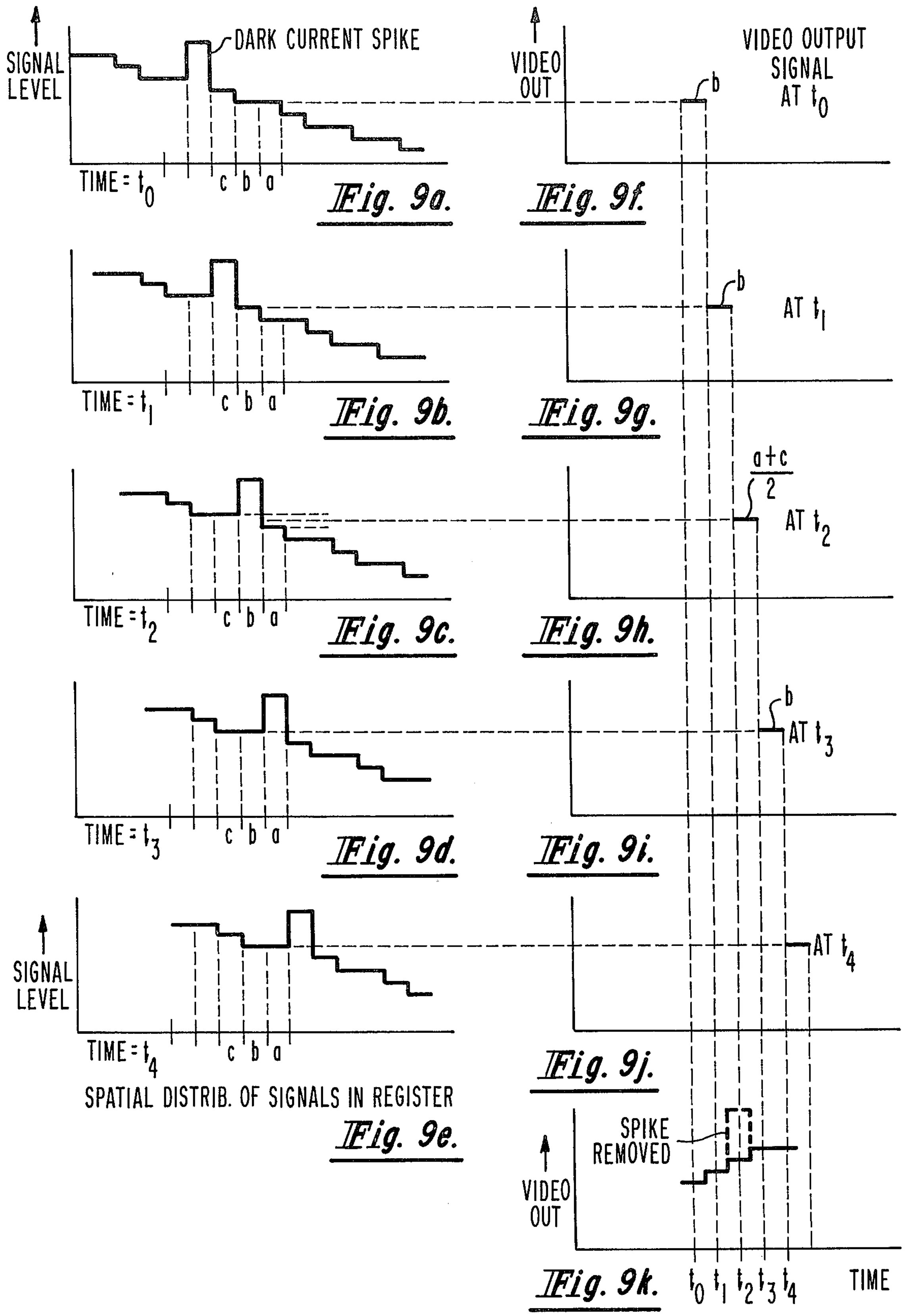

The operation of the circuit of FIG. 8 is depicted in FIG. 9. FIGS. 9*a*–9*e* show the spatial distribution of charge in register 100 during successive intervals of time $t_0$–$t_4$. FIGS 9*f*–9*j* show the level of the video output signal produced during these intervals $t_0$–$t_4$. FIG. 9*k* shows the composite video output (with the dark current spike removed).

What is claimed is:

1. A circuit for processing the signals produced by an image sensor in response to photoexcitation of the image receiving locations of said sensor comprising, in combination:

means for producing for each location of the image sensor, a control signal indicative of the amplitude of the dark current at that location; and means responsive to the control signal indicative of dark current at a location and the signals, hereinafter termed "information" signals, produced at adjacent locations when exposed to photo-excitation, for substituting for the information signal produced at a location having a dark current component which exceeds a given threshold level a second signal of an amplitude related to that of the information signals present in said adjacent locations.

2. A circuit as set forth in claim 1 in which said means for producing a control signal indicative of dark current comprises means for operating the sensor in the dark for a given interval of time to produce at each location a dark current signal.

3. A circuit as set forth in claim 2 wherein said means for producing a control signal indicative of dark current comprises a shutter in the path of the radiation creating said photo-excitation and means for periodically closing said shutter.

4. A circuit as set forth in claim 3 wherein said shutter comprises an electro-optic shutter.

5. A circuit as set forth in claim 1 wherein the means for producing a control signal indicative of the amplitude of the dark current comprises means for comparing the amplitude of the information signal produced at each location with the amplitude of the information signals produced at the locations on each side thereof, and when the difference between them, in both cases, is greater in a given sense than a given amount, producing a signal to so indicate.

6. A circuit as set forth in claim 1 wherein said image sensor comprises an array which includes locations arranged in columns and rows and wherein the means for producing a control signal indicative of dark current comprises means for permitting the sensor to accumulate signals in the dark for a given interval of time; means for removing these dark current signals from the sensor a row at a time; and means for comparing the removed signals, one at a time, with a threshold level for ascertaining which of the removed signals exceed said threshold level.

7. A circuit as set forth in claim 6, wherein said means for substituting comprises circuit means receptive of two signals, proportional to an information signal taken from a location adjacent to and on one side of a particular location exhibiting dark current of greater than a given value and the second proportional to an information signal taken from a location adjacent to and on the other side of said particular location, for producing an output signal proportional to the average value of said two information signals.

8. A circuit as set forth in claim 1 wherein said image sensor comprises a photodiode array, and wherein said means for producing a control signal indicative of dark current comprises means for charging a row of said photodiodes, during one portion of a line time, to a back bias voltage level such as to enhance the production of dark current relative to production of photoexcited current and, means for reading from said row of photodiodes the dark currents stored therein, after a given dark current integration time still within said line time and during which said array is exposed to said photoexcitation.

9. A circuit for processing the signals produced by an image sensing array in response to photo-excitation of said array comprising, in combination:

means for exposing said array to said image to produce a charge pattern corresponding to said image;

first and second storage means;

means for transferring at least a portion of the charge pattern stored in said array to said first storage means;

means for obtaining a charge pattern of the dark currents produced in the same region of said array from which said charge pattern is transferred;

means for transferring said charge pattern of dark currents from said same region of said array to said second storage means;

means for sequentially reading the contents of said second storage means for producing a control signal indicative of dark current amplitude;

an output terminal; and means for sequentially reading the contents of said first storage means concurrently with the readout of said second storage means and responsive to said control signal for applying the signals read from said first storage means to said output terminal in response to a value of said control signal indicative of dark current of lower than a given level and for applying a second signal having a value close to that of adjacent signals read from said first storage means to said output terminal, in response to a second value of said control signal indicative of dark current of greater than a given level.

10. A circuit as set forth in claim 9 wherein said means for obtaining a charge pattern of dark currents comprises means for maintaining at least said region of the array in the dark for a given interval of time.

11. A circuit as set forth in claim 9 wherein said means for obtaining a charge pattern of dark currents comprises a plurality of switches, one at each location in said region, means for concurrently closing the switches in said region and applying through each closed switch a voltage to charge the image sensing means at each location to a level at which the dark current production is enhanced many times more than the photoexcitation current and then opening said switches, and means for then permitting the dark current to integrate for a given interval of time.

* * * * *